United States Patent Office 3,323,588
Patented June 6, 1967

3,323,588
METHOD OF SECONDARY RECOVERY EMPLOYING SUCCESSIVE FOAM DRIVES OF DIFFERENT IONIC CHARACTERISTICS
Charanjit Rai and George G. Bernard, Crystal Lake, Ill., assignors, by mesne assignments, to Union Oil Company of California, Los Angeles, Calif., a corporation of California
No Drawing. Filed Sept. 28, 1964, Ser. No. 399,823
11 Claims. (Cl. 166—9)

This invention relates to the recovery of petroleum from subterranean formations and reservoirs and is more particularly concerned with a flooding process for recovering petroleum in greater amounts than is possible by conventional flooding methods.

It is well known in the secondary recovery art to inject a slug of fluid which is miscible with both the petroleum oil and the water phases in the reservoir and to drive the slug of fluid through the reservoir by injecting flood water behind it. Typical of the fluids used in such secondary recovery processes are the lower alcohols. It has also been suggested to dispose a foam bank between an alcohol slug and the subsequent water flood. However, while it has been found that experimentally the results obtained by these methods should be beneficial, such has not been the case in that recoveries much less than theoretical have been obtained.

While the art is well aware of the attributes of a solvent waterflood secondary recovery method and of a foam waterflood secondary recovery method, it is only natural to expect that the combination of the two methods would result in even more efficient oil recoveries. This could be expected, firstly, because a foam bank would be generated intermediate to the solvent slug and the subsequent water flood, thereby reducing the dilution of the solvent slug by the subsequently injected flood water. Secondly, the foam bank would tend to increase the viscosity of the lead portion of the water drive and would also seek out the more highly permeable sections of the reservoir, thereby plugging them and redirecting the water drive into the tighter or less permeable rock. However, for reasons which are presently unknown, the combination of the two methods has not met with much success. It has been unexpectedly found, however, that where two different foams are disposed between a solvent slug and a subsequent drive medium high oil recoveries are obtained. By two different foams is meant a first foam generated from an anionic or cationic surfactant or surface-active agent and a second foam generated from a surfactant or surface-active agent having opposite ionic properties. Thus, where the first foam is cationic in nature or is generated from a cationic surfactant, the second surfactant used to generate a second foam should be anionic in nature.

Briefly, this invention teaches a process for the recovery of oil from reservoirs in subterranean oil-bearing formations comprising the steps of first injecting a slug of an oxygenated hydrocarbon, then injecting a surfactant having cationic or anionic characteristics, then injecting a quantity of gas to substantially foam the quantity of surfactant. Having thus formed a first foam within the reservoir or formation, a surfactant is then introduced having an opposite ionic characteristic of the first surfactant and this surfactant is likewise contacted with a gas to generate foam within the reservoir or formation. Finally, a driving fluid is injected to drive the first injected material through the formation to a producing well wherein petroleum is obtained in high yields.

It is an object of this invention to provide an improved method of the secondary recovery of oil from underground reservoirs and formations. Another object of this invention is to provide a method for recovering a higher percentage of petroleum from subterranean formations and reservoirs by the use of an oxygenated hydrocarbon slug separated from a subsequent driving fluid by a foam bank generated by surfactants having opposite ionic properties.

While it is known or has been suggested that the alternation of different classes of surfactants or surface active agents, such as cationic or anionic, provide more effective oil displacement from a reservoir, it is not known just why or under what mechanism this is accomplished. It has been suggested that cationic surfactants tend to cause formation of water-in-oil emulsions while anionic surfactants or surface-active agents tend to form oil-in-water type emulsions. It has also been suggested that these various surfactants will have some effect on the formation's wettability. It is difficult to distinguish, however, the causes and effects in this situation in that it cannot be stated with certainty whether wettability of the formation controls the type of emulsion which forms or if the type of emulsion controls the wettability. It is more probable that the same factors which cause an oil-in-water type of emulsion to form also cause the formation to be water-wet. Thus, both wettability and type of emulsion are probably effects of the same causes. However, these propositions have generally been associated with the use of the various surfactants in solution form rather than in foam form. It is also well recognized that foam once generated in a subterranean formation or reservoir will preferentially invade the more permeable zones, channels, etc., thereby plugging same so that subsequently injected flood media will be directed to the less permeable or tigher oil-bearing rock, thereby displacing more of the oil from these sections. Whether the attributes of our invention may be attributed to the types of emulsions that are formed or to the wettability characteristics created by the foams, or to the creation of a physical effect, such as permeable strata plugging, can only provide a basis for supposition. We are not prepared at this time to submit to one theory or the other. It has, nevertheless, been found that where a reservoir is treated in accordance with our invention greater oil recoveries are obtained than has been heretofore possible.

In carrying out the process of this invention, a slug of oxygenated hydrocarbon in the amount of 0.02 to 0.5 reservoir pore volume is first injected through an input well into a petroleum-bearing formation. The volume of solvent injected is not critical but should be sufficient in amount to provide a band of solvent which will maintain its integrity while moving through at least a major portion of the reservoir or formation. Quantities of solvent suitable for this purpose will generally be about 0.05 reservoir pore volume and larger quantities will seldom be more effective and will add to the expense of the process without producing a proportionate increase in the oil ultimately recovered. After the solvent is injected into the formation, there is injected a cationic surfactant in an amount sufficient to form a stable foam bank under formation temperature and conditions. The surfactant or surface-active agent having cationic properties will normally be injected in an amount equal to 0.02 to 0.20 reservoir pore volume with the preferred amount being about 0.05 pore volume. The cationic surfactant will then be contacted by a gas which is subsequently injected to generate foam adjacent the bank of oxygenated hydrocarbon. Following the foaming of the cationic surfactant a sufficient amount of anionic surfactant or surface-active agent is then injected and foamed in a similar fashion as the cationic surfactant. The amount of the anionic surfactant will generally be within the same ranges as the amounts of cationic surfactant utilized. After a sufficient amount of gas has been injected to foam substantially all of the anionic surfactant a fluid drive is instituted to drive the solvent bank and foam banks through a major portion of the reservoir to a producing well.

Surface-active agents and foaming agents hereinafter referred to in the specification and appended claims as "surfactant" should be one capable of forming a stable foam under formation or reservoir conditions when it is intimately contacted with a liquid and a gas. The foams formed immediately after the solvent slug should be generated from surfactants having opposite ionic properties. Thus, where a cationic surfactant is foamed to produce a bank of foam adjacent the solvent bank, the next injected surfactant should be anionic and a foam bank generated adjacent the first formed foam bank. Various anionic and cationic agents or surfactants may be selected from commercially published lists which describe their properties. Information concerning such surfactants may be found in Encyclopedia of Surface Active Agents by J. P. Sisley, translated from the French by P. J. Wood, Chemical Publishing Company, New York, 1952, and Detergents and Demulsifiers by John W. McCutcheon, Inc., 1964. If appropriate, the surfactant may be injected into the formation alone where sufficient connate water is present or alternatively it may be incorporated in an aqueous vehicle. The use of an aqueous vehicle is preferable in that the surfactant is more readily dispersed within the interstices of the formation. When the surfactant is incorporated in an aqueous vehicle, the size of the vehicle will normally comprise 0.02 to 0.2 reservoir pore volume; the practical size being about 0.05 reservoir pore volume. The cationic or anionic surfactant will normally comprise about 0.01 to 10 weight percent of the aqueous slug, with the preferred amount being about 1.0 weight percent. Preferably, the surfactants utilized in this invention are those which form a stable foam in the presence of crude oil; in reservoirs where the interstitial water contains a high concentration of salt, a surfactant is used which foams readily in the presence of oil and brine. Non-limiting examples of surfactive agents which may be used in the practice of this invention are:

*Cationic surfactants*

| Trade name | Chemical name |
|---|---|
| Arquad T2C–50 | Dicocodimethyl ammonium chloride. |
| Hyamine 1622 | Diisobutylphenoxyethoxyethyl dimethylbenzyl ammonium chloride. |
| Triton X–400 | Stearyldimethylbenzyl ammonium chloride. |

*Anionic surfactants*

| Trade name | Chemical name |
|---|---|
| Sipon ES | Sodium salt of lauryl ether sulfate. |
| Triton GR–5 | Dioctyl sodium sulfosuccinate. |
| Solar 25 | Coconut oil fatty acid amine condensate. |

The concentration of the surfactant in the aqueous solution employed in accordance with the invention will depend in large part on the particular agent utilized and the type of formation which is to be produced. For instance, where a particular type of formation creates a condition under which much of the surfactant is absorbed or adsorbed in the interstices of the formation it will be necessary to employ a greater amount of surfactant so that a sufficient amount will remain to form a foam bank within the reservoir upon the subsequent injection of a gas. The quantity of surfactant vehicle carrier will depend also upon such well recognized factors as the recovery pattern, spacing between wells, the porosity of the formation and the thickness of the formation. Ideally, the quantity of vehicle or aqueous solution employed should be such that a sufficient amount of liquid is available to produce foam from the surfactant solution when the solution is intimately contacted with a gas.

A wide variety of gases are available which may be used to generate foam from the cationic and anionic surfactants. The gas chosen should be substantially inert, that is, chemically nonreactive under reservoir conditions. Suitable gases include but are not limited to nitrogen, flue gas, air, and natural gas. Similarly, a wide variety of materials are available which may be used as the solvent or oxygenated hydrocarbon. Preferably, the solvent will be miscible with both petroleum oil and water and still more preferably will have a partition coefficient favoring solution in oil when in the presence of both oil and water. Typical suitable solvents are partially oxidized hydrocarbons such as alcohols including tert-butanol, sec-butanol, n-butanol, isopropanol, n-propanol, and pentanols. Other suitable materials include ketones, such as methyl ethyl ketone, diethyl ketone, and di-n-propyl ketone; aldehydes, such as acetaldehyde, propanol and butyl aldehyde, and organic acids such as acetic acid, propionic acid, butyric acid and isobutyric acid. Mixtures of the aforenamed liquids may also be used in the process of this invention. Mixtures of partially oxidized hydrocarbons produced by hydrocarbon oxidation processes comprising a wide variety of alcohols, aldehydes, ketones, acids and other constituents may be used provided the weighted average of the solubilities of the constituents in petroleum is suitably high. Such mixtures may contain minor amounts of materials having low solubility in petroleum, such as methyl and ethyl alcohols, provided the quantities of such constituents are not excessive and other more soluble constituents are present in qauntity. Mixtures of $C_3$–$C_7$ alcohols, ketones, aldehydes and organic acids are suitable.

The effectiveness of the method of this invention has been established by conducting several comparative tests. In each test a dual sand pack simutating a heterogeneous reservoir was utilized. Two 9' parallel sand packs, one having a permeability of 4,100 millidarcies and the other having a permeability of 22,300 millidarcies, provided the test "reservoir." The sand packs in each of the experiments were initially saturated with a 1.5 percent brine solution. Thereafter, each of the sand packs was driven with Dollarhide crude oil to connate water saturation and water flooded with a 1.5 percent brine solution to residual oil saturation. The residual oil saturation in each case was about 32 percent, after three pore volumes of water were injected. The test conditions were substantially identical in each experiment. The following tabulation indicates the results of those experiments wherein water alone, a solvent followed by water and the solvent followed by various foams followed by water were injected into the dual sand pack and their effectiveness noted.

TABLE I

| Experiment | Method | Percent Oil Recovered/ Total Volume of Fluids Injected | | |
|---|---|---|---|---|
| | | 1 | 2 | 3 |
| 1 | Water | 48 | 54 | 60 |
| 2 | 0.2 PV IPA, water | 52 | 58 | 64 |
| 3 | 0.2 PV IPA, 0.3 PV water, 1.0 PV $N_2$, water. | 55 | 63 | 76 |
| 4 | 0.2 PV IPA, 0.3 PV water containing 1 wt. percent "Sipon ES," 1.0 PV $N_2$, water. | 56 | 60 | 66 |
| 5 | 0.2 PV IPA, 0.3 PV water containing 1 wt. percent "Armomist," 1.0 PV $N_2$, water. | 57 | 62 | 72 |
| 6 | 0.2 PV IPV, 0.15 PV water containing 1 wt. percent "Armomist," 0.5 PV $N_2$, 0.15 PV water containing 1 wt. percent "Sipon ES," 0.5 PV $N_2$, water. | 61 | 78 | 83 |
| 7 | 0.2 PV IPA, 0.15 PV water containing 1 wt. percent "Armomist," 0.15 PV "Sipon ES," 1.0 PV $N_2$, $H_2O$. | 54 | 64 | 71 |

From the foregoing tabulation it is quite evident that Experiment 6 using the method of the hereindescribed invention wherein a solvent such as isopropyl alcohol precedes a foam bank generated from a cationic surfactant such as "Armomist" and a foam generated from an anionic surfactant such as "Sipon ES" driven through a reservoir by a water drive yields the highest percentage of oil recovered. "Armomist" and "Sipon ES" are cationic and anionic surfactants, respectively; made available commercially by Armour Industrial Chemical Company and Alcolac Chemical Company, respectively. "Armomist" is a commercial trade name for a surfactant material known chemically as a quaternary ammonium salt and "Sipon ES" is an anionic surfactant material which is the commercial trade name for the generic chemical compound lauryl ether sulfate salt. In the foregoing experiments the solvent used was isopropyl alcohol and the gas used to generate foam within the sand packs followings the introduction of the surfactants was nitrogen. From Experiments 6 and 7 it is quite obvious that the great benefits of our invention are obtained when a foam is disposed between a solvent and a fluid drive wherein a portion of the foam bank is derived from surfactant materials having opposite ionic properties.

As a specific example of one embodiment of the invention, an oil-bearing subterranean reservoir has drilled therethrough a plurality of wells conforming to the conventional five spot pattern. Through the center or injection well, there is injected 0.05 pore volume of isopropyl alcohol followed by 0.02 pore volume of an aqueous solution of a cationic surfactant, such as Arquad 2C. Thereafter, about 0.02 pore volume of natural gas is injected to cause substantially complete foaming of the Arquad 2C solution wherein the Arquad 2C is present in the aqueous solution in the amount of 1 weight percent. After the gas injection, 0.02 pore volume of an aqueous solution containing 1 weight percent of Triton GR-4, an anionic surfactant, is injected into the injection well followed by 0.02 pore volume of natural gas, which causes substantially complete foaming of the surfactant solution. Thereafter, water flood is commenced to move at least the major portions of the intitially injected fluids or the bank of foam through the reservoir to the production wells. Production of fluids from the production well is carried on until the ratio of oil to the produced fluid becomes economically unattractive, at which time water injection into the injection well and fluid production from the production wells are terminated.

The driving fluids suitable for use in the practice of our invention are those generally known in the secondary recovery art. Nonlimiting examples of such fluid are carbonated water, brine, plain water, air, flue gas, carbon dioxide, nitrogen, natural gas, etc. For economy it is preferred to use an aqueous driving fluid such as water.

The embodiments of the invention in which an exclusive property of privilege is claimed are defined as follows:

1. In the method of recovering petroleum oil from a subterranean oil-bearing formation wherein a slug of an oxygenated hydrocarbon is driven through said formation by means of a fluid drive, the improvement which comprises disposing successive foams, generated from surfactants of different ionic characteristics selected from the group consisting of cationic surfactants and anionic surfactants, between said oxygenated hydrocarbon and said fluid drive.

2. The method in accordance with claim 1 wherein said first foam is generated from a cationic surfactant and said second foam is generated from an anionic surfactant.

3. The method is accordance with claim 2 wherein said oxygenated hydrocarbon is selected from the group consisting of alcohols, ketones, aldehydes, acids and mixtures thereof.

4. The method in accordance with claim 3 wherein said drive fluid is water.

5. A method for the recovery of petroleum oil from a subterranean oil-bearing formation penetrated by an injection well and a production well comprising injecting into said injection well in sequence
   (a) 0.02 to 0.5 pore volume of an oxygenated hydrocarbon,
   (b) a cationic surfactant capable of forming foam under formation conditions when intimately contacted with a liquid and a gas in an amount sufficient to produce a foam bank,
   (c) an effective quantity of gas to cause substantially complete foaming of said cationic surfactant,
   (d) an anionic surfactant capable of forming foam under formation conditions when intimately contacted with a liquid and a gas in an amount sufficient to produce a foam bank,
   (e) an effective quantity of gas to cause substantially complete foaming of said anonic surfactant, and
   (f) a sufficient amount of driving fluid to drive at least a portion of the initially injected materials to said production well and recovering fluids therefrom.

6. The method in accordance with claim 5 wherein the oxygenated hydrocarbon is selected from the group consisting of $C_3$–$C_7$ alcohols, aldehydes, ketones, acids and mixtures thereof.

7. The method in accordance with claim 5 wherein the cationic surfactant is incorporated in about 0.02 to 0.2 pore volume of an aqueous slug and comprises about 0.01 to 10 wt. percent of said slug.

8. The method in accordance with claim 5 wherein the anionic surfactant is incorporated in about 0.02 to 0.2 pore volume of an aqueous slug and comprises about 0.01 to 10 wt. percent of said slug.

9. The method in accordance with claim 5 wherein the amount of gas injected after each quantity of surfactant comprises about 0.02 to 0.2 pore volume and is selected from the group consisting of air, nitrogen, natural gas, and flue gas.

10. The method in accordance with claim 5 wherein the driving fluid is water and comprises about 0.3 to 3 pore volumes.

11. A method for the recovery of petroleum oil from a subterranean oil-bearing formation penetrated by at least one injection well and one production well comprising injecting into said injection well in sequence
    (a) 0.02 to 0.5 pore volume of isopropyl alcohol,
    (b) 0.02 to 0.20 pore volume of an aqueous solution containing 0.01 to 10 wt. percent of a cationic surfactant,
    (c) 0.02 to 0.20 pore volume of air,
    (d) 0.02 to 0.20 pore volume of an aqueous solution containing 0.01 to 10 wt. percent of an anionic surfactant,
    (e) 0.02 to 0.20 pore volume of air, and
    (f) 0.3 to 3.0 pore volumes of water to drive at least a portion of the initially injected materials to said production well and recovering fluids therefrom.

References Cited
UNITED STATES PATENTS

| | | | |
|---|---|---|---|
| 2,800,962 | 7/1957 | Garst | 166—9 |
| 2,812,817 | 11/1957 | Sayre | 166—9 |
| 2,866,507 | 12/1958 | Bond et al. | 166—9 |
| 3,033,288 | 5/1962 | Holm | 166—9 |

(Other references on following page)

UNITED STATES PATENTS

| | | | |
|---|---|---|---|
| 3,080,917 | 3/1963 | Walker | 166—9 |
| 3,100,524 | 8/1963 | Beeson | 166—9 |
| 3,177,939 | 4/1965 | Holm et al. | 166—9 |
| 3,185,634 | 5/1965 | Craig et al. | 166—9 |
| 3,196,944 | 7/1965 | Bernard et al. | 166—9 |
| 3,236,303 | 2/1966 | Csaszar | 166—9 |

OTHER REFERENCES

Bernard, George G., Effect of Foam on Recovery of Oil by Gas-Drive. In Producers Monthly, 27(1), January 1963, pp. 18–21.

CHARLES E. O'CONNELL, *Primary Examiner.*

I. A. CALVERT, *Assistant Examiner.*